US009784971B2

(12) United States Patent
Wong et al.

(10) Patent No.: US 9,784,971 B2
(45) Date of Patent: Oct. 10, 2017

(54) METHODS AND DEVICES FOR RENDERING INTERACTIONS BETWEEN VIRTUAL AND PHYSICAL OBJECTS ON A SUBSTANTIALLY TRANSPARENT DISPLAY

(71) Applicant: Google Inc., Mountain View, CA (US)

(72) Inventors: Adrian Wong, Mountain View, CA (US); Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 246 days.

(21) Appl. No.: 14/626,294

(22) Filed: Feb. 19, 2015

(65) Prior Publication Data

US 2015/0177518 A1 Jun. 25, 2015

Related U.S. Application Data

(63) Continuation of application No. 13/253,695, filed on Oct. 5, 2011, now Pat. No. 8,990,682.

(51) Int. Cl.
*G02B 1/00* (2006.01)
*G02B 27/01* (2006.01)
*G06T 19/00* (2011.01)

(52) U.S. Cl.
CPC .......... *G02B 27/017* (2013.01); *G06T 19/006* (2013.01); *G02B 2027/014* (2013.01);
(Continued)

(58) Field of Classification Search
CPC ..... G06F 3/012; G06T 19/006; G02B 27/017; G02B 2027/0178
See application file for complete search history.

(56) References Cited

U.S. PATENT DOCUMENTS 5,900,849 A 5/1999 Gallery
5,977,935 A 11/1999 Yasukawa et al.
(Continued)

FOREIGN PATENT DOCUMENTS

EP 2 211 224 A1 7/2010

OTHER PUBLICATIONS

Mims, "Augmented Reality Interface Exploits Human Nervous System", MIT Technology Review, Apr. 7, 2011, 3 pages.
(Continued)

*Primary Examiner* — Stephen Hong
*Assistant Examiner* — Marshon Robinson
(74) *Attorney, Agent, or Firm* — McDonnell Boehnen Hulbert & Berghoff LLP

(57) ABSTRACT

Disclosed are methods and devices for rendering interactions between virtual and physical objects on a substantially transparent display are disclosed. In one embodiment, the method includes displaying a user-interface on a substantially transparent display of a wearable computing device. The method further includes displaying a virtual object in the view region at a focal length along a first line of sight and detecting a physical object at a physical distance along a second line of sight. The method still further includes determining that a relationship between the focal length and the physical distance is such that the virtual object and the physical object appear substantially co-located in a user-view through the view region and, responsive to the determination, initiating a collision action between the virtual object and the physical object.

20 Claims, 13 Drawing Sheets

(52) U.S. Cl.
CPC ............... *G02B 2027/0138* (2013.01); *G02B 2027/0141* (2013.01); *G02B 2027/0178* (2013.01)

(56) References Cited

U.S. PATENT DOCUMENTS

| | | | |
|---|---|---|---|
| 6,184,847 B1 | 2/2001 | Fateh et al. | |
| 6,292,198 B1 | 9/2001 | Matsuda et al. | |
| 6,327,522 B1 | 12/2001 | Kojima et al. | |
| 6,396,497 B1 | 5/2002 | Reichlen | |
| 6,771,294 B1 | 8/2004 | Pulli et al. | |
| 6,803,928 B2 | 10/2004 | Bimber et al. | |
| 6,951,515 B2 | 10/2005 | Ohshima et al. | |
| 7,199,807 B2* | 4/2007 | Kobayashi | G06T 19/006 345/422 |
| 7,693,702 B1 | 4/2010 | Kerner et al. | |
| 7,724,278 B2 | 5/2010 | Maguire, Jr. | |
| 7,825,996 B2 | 11/2010 | Yamada et al. | |
| 7,928,926 B2 | 4/2011 | Yamamoto et al. | |
| 8,405,680 B1 | 3/2013 | Cardoso Lopes et al. | |
| 2002/0044152 A1 | 4/2002 | Abbott et al. | |
| 2003/0020707 A1 | 1/2003 | Kangas et al. | |
| 2003/0210228 A1 | 11/2003 | Ebersole et al. | |
| 2003/0210380 A1 | 11/2003 | Westort et al. | |
| 2004/0046711 A1 | 3/2004 | Triebfuerst | |
| 2004/0093141 A1 | 5/2004 | Rao et al. | |
| 2004/0239670 A1 | 12/2004 | Marks | |
| 2005/0104882 A1 | 5/2005 | Kobayashi et al. | |
| 2005/0154505 A1 | 7/2005 | Nakamura et al. | |
| 2006/0090135 A1 | 4/2006 | Fukuda | |
| 2006/0139374 A1 | 6/2006 | Ritter et al. | |
| 2007/0035563 A1 | 2/2007 | Biocca et al. | |
| 2007/0241936 A1 | 10/2007 | Arthur et al. | |
| 2008/0005702 A1 | 1/2008 | Skourup et al. | |
| 2008/0094417 A1 | 4/2008 | Cohen | |
| 2008/0150965 A1 | 6/2008 | Bischoff et al. | |
| 2008/0218515 A1 | 9/2008 | Fukushima et al. | |
| 2009/0005961 A1 | 1/2009 | Grabowski et al. | |
| 2009/0128449 A1 | 5/2009 | Brown et al. | |
| 2009/0140845 A1 | 6/2009 | Hioki | |
| 2009/0153976 A1* | 6/2009 | Dolgoff | G02B 27/2278 359/630 |
| 2009/0187389 A1 | 7/2009 | Dobbins et al. | |
| 2009/0278917 A1 | 11/2009 | Dobbins et al. | |
| 2010/0007807 A1 | 1/2010 | Galstian et al. | |
| 2010/0039353 A1 | 2/2010 | Cernasov | |
| 2010/0125799 A1 | 5/2010 | Roberts et al. | |
| 2010/0149073 A1 | 6/2010 | Chaum et al. | |
| 2010/0159434 A1 | 6/2010 | Lampotang et al. | |
| 2010/0164990 A1 | 7/2010 | Van Doorn | |
| 2010/0177403 A1* | 7/2010 | Dolgoff | G02B 27/2278 359/629 |
| 2010/0253700 A1 | 10/2010 | Bergeron | |
| 2010/0283683 A1 | 11/2010 | Kurokawa | |
| 2010/0292886 A1 | 11/2010 | Szczerba et al. | |
| 2011/0140994 A1 | 6/2011 | Noma | |
| 2011/0161875 A1 | 6/2011 | Kankainen | |
| 2011/0214082 A1 | 9/2011 | Osterhout | |
| 2011/0221668 A1* | 9/2011 | Haddick | G02B 27/017 345/156 |
| 2012/0068913 A1 | 3/2012 | Bar-Zeev et al. | |
| 2012/0075168 A1 | 3/2012 | Osterhout et al. | |
| 2012/0212399 A1 | 8/2012 | Border et al. | |
| 2012/0224060 A1 | 9/2012 | Gurevich et al. | |
| 2012/0293548 A1 | 11/2012 | Perez et al. | |
| 2012/0299950 A1 | 11/2012 | Ali et al. | |
| 2012/0306850 A1 | 12/2012 | Balan et al. | |
| 2013/0044128 A1 | 2/2013 | Liu et al. | |
| 2013/0278631 A1 | 10/2013 | Border et al. | |
| 2013/0300637 A1 | 11/2013 | Smits et al. | |
| 2013/0328762 A1 | 12/2013 | McCulloch et al. | |
| 2013/0335301 A1 | 12/2013 | Wong et al. | |

OTHER PUBLICATIONS

Henderson et al., "Exploring the Benefits of Augmented Reality Documentation for Maintenance and Repair", IEEE Transaction on Visualization and Computer Graphics, 2011, 17(10), 14 pages.

Dynamic Drive, "Fancy Cursor Script IE", Internet Website: http://web.archive.org/web/19990129031353/http://www.dynamicdrive.com/dynamicindex11/fcursor.htm, 1999, 2 pages.

David E. Breen et al., "Interactive Occlusion and Automatic Object Placement for Augmented Reality," Computer Graphics Forum, vol. 15, Issue 3 (Aug. 1996), pp. 11-22.

Cohn, "On the Back of the Bus", 21 University of California Transportation Center: Access Magazine 17-21 (2002).

* cited by examiner

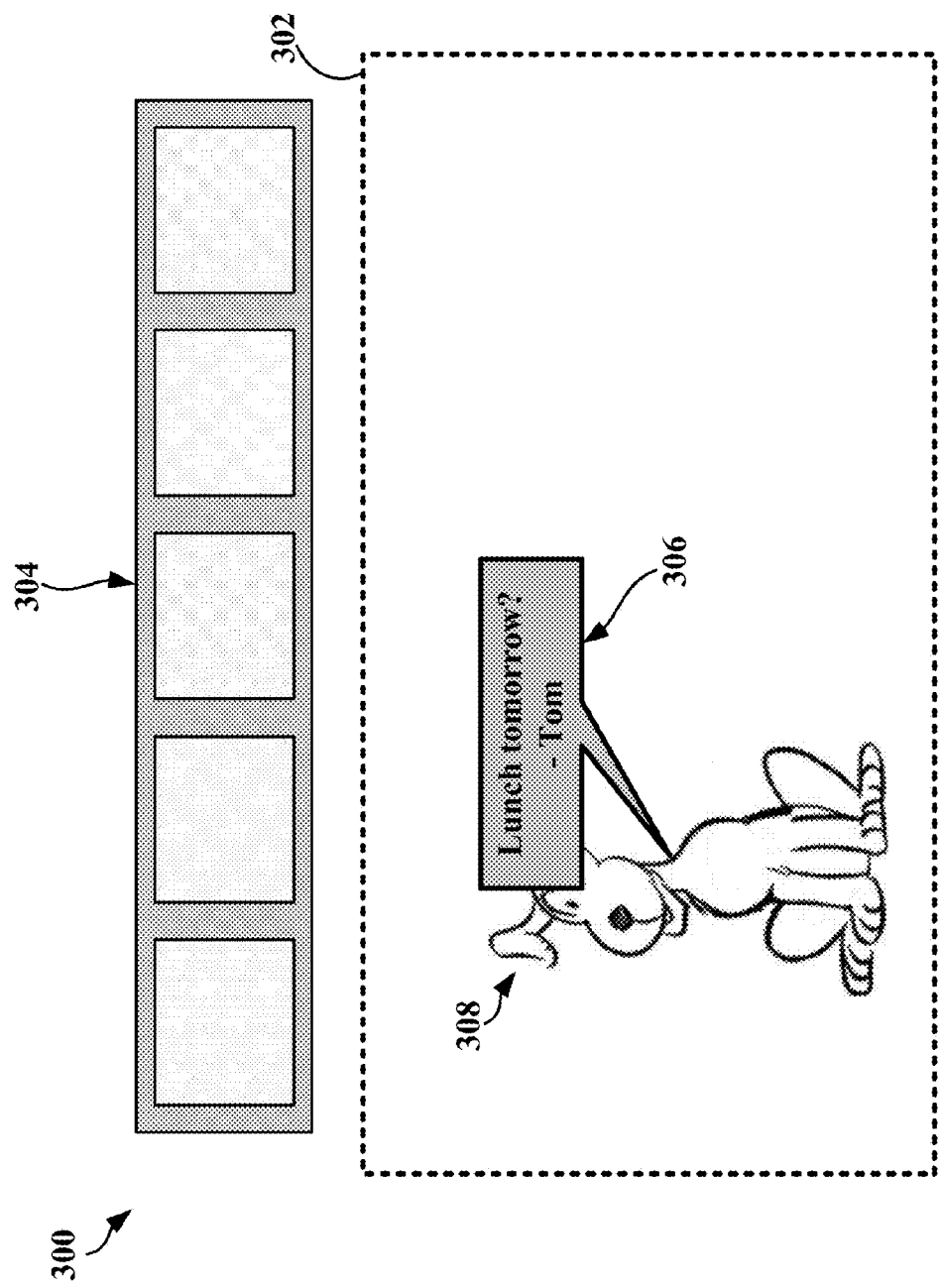

METHODS AND DEVICES FOR RENDERING INTERACTIONS BETWEEN VIRTUAL AND PHYSICAL OBJECTS ON A SUBSTANTIALLY TRANSPARENT DISPLAY

CROSS REFERENCE TO RELATED APPLICATION

This application claims priority to U.S. patent application Ser. No. 13/253,695, filed Oct. 5, 2011, entitled "Methods and Devices for Rendering Interactions Between Virtual and Physical Objects on a Substantially Transparent Display," now pending, the contents of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and other Internet-capable devices are increasingly prevalent in modern life. Over time, the manner in which these devices provide information to users has become more intelligent, more efficient, more intuitive, and/or less obtrusive.

The trend toward miniaturization of computing hardware and peripherals, as well as of sensors, detectors, and image and audio processors, among other technologies, has aided the emergence of a field sometimes referred to as "wearable computing." Wearable computing typically involves a user wearing a wearable display, such as, for example, a head-mounted display.

The wearable display typically includes a display element, such as, for example, a near-eye display element, arranged near to one or both of the user's eyes. A small image may be displayed on the display element. The image may be, for example, generated by a computing device coupled to the wearable display. Due to the nearness of the display element, the small image may fill or nearly fill a field of view of the user. As a result, the small image may appear to the user as a larger image, such as might be displayed on a traditional image display device.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Other applications are possible as well.

SUMMARY

Methods and devices for rendering interactions between virtual and physical objects on a substantially transparent display are disclosed.

In one aspect, a computer-implemented method is disclosed. The method includes displaying a user-interface on a substantially transparent display of a wearable computing device. The user-interface comprises a view region and at least one content region that is located outside of the view region, the view region substantially fills a field of view of the display, and the at least one content region is not fully visible in the field of view. The method further includes displaying a virtual object at a focal length from the wearable computing device along a first line of sight, and detecting a physical object a distance from the wearable computing device along a second line of sight. The method still further includes making a first determination that the focal length is substantially equal to the distance, making a second determination that the first line of sight is substantially aligned with the second line of sight, and, responsive to the first and second determinations, initiating a collision action comprising at least one of the virtual object moving away from the physical object and the virtual object changing shape.

In another aspect, a non-transitory computer-readable medium is disclosed having stored therein instructions executable by a computing device to cause the computing device to perform the functions of the method described above.

In yet another aspect, a wearable computing device is disclosed. The wearable computing device includes a substantially transparent display, at least one processor, and data storage. The data storage comprises logic executable by the at least one processor to display a user-interface on the substantially transparent display. The user-interface comprises a view region and at least one content region that is located outside of the view region, the view region substantially fills a field of view of the display, and the at least one content region is not fully visible in the field of view. The logic is further executable by the at least one processor to display a virtual object at a focal length from the wearable computing device along a first line of sight. The logic is further executable by the at least one processor to detect a physical object a distance from the wearable computing device along a second line of sight. The logic is still further executable by the at least one processor to make a first determination that the focal length is substantially equal to the distance, make a second determination that the first line of sight is substantially aligned with the second line of sight, and, responsive to the first and second determinations, initiate a collision action comprising at least one of the virtual object moving away from the physical object and the virtual object changing shape.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

FIG. 3A shows aspects of an example user-interface in which a virtual object and a physical object are co-located, in accordance with an embodiment.

DETAILED DESCRIPTION

Figure 1A:
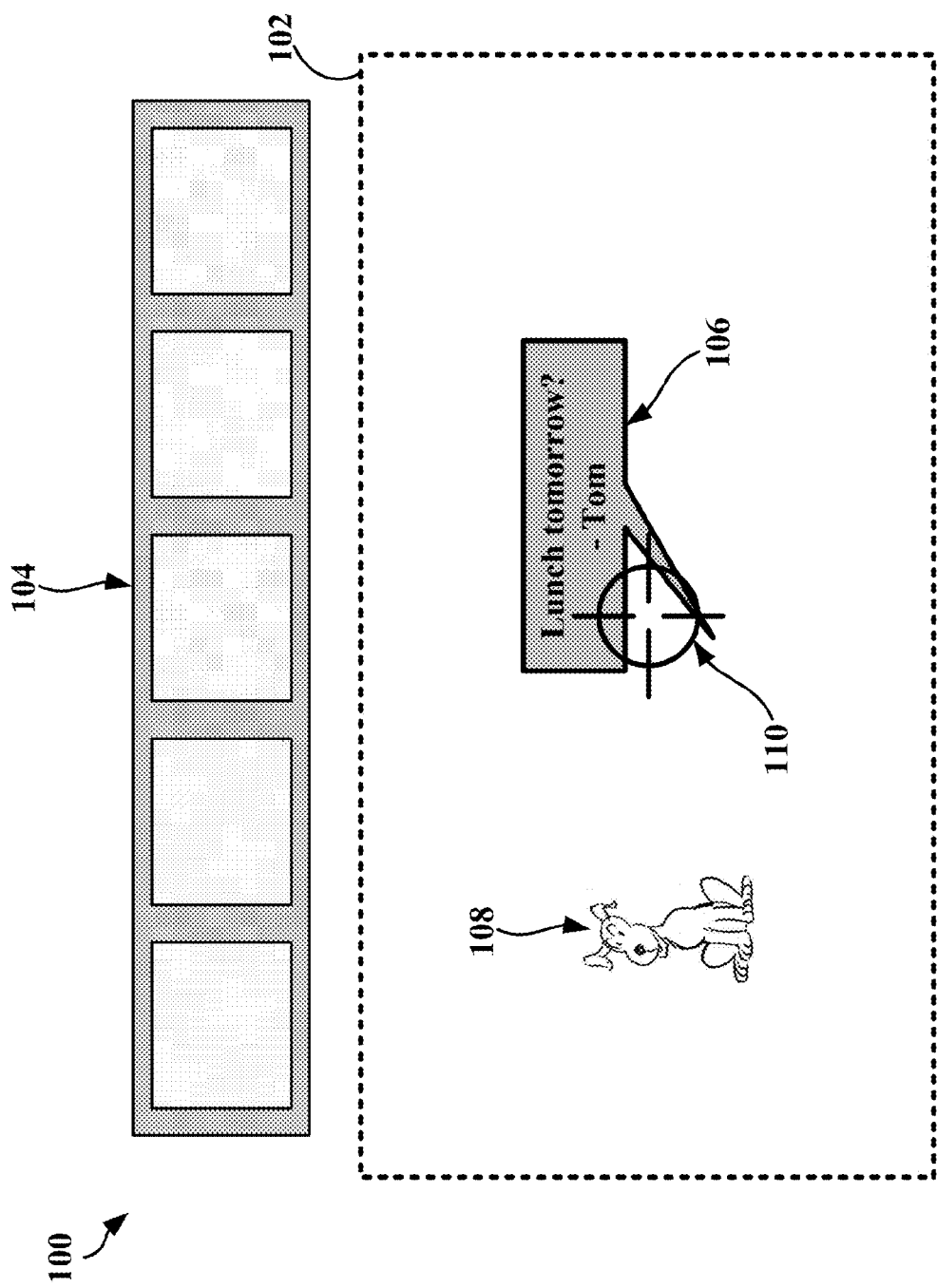
FIG. 1A shows aspects of an example user-interface, in accordance with an embodiment.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

A wearable computing device may be or may include a head-mounted display that presents virtual objects (e.g., computer images or graphics) on a substantially transparent display. Hence, the user of the wearable computing device may maintain a view of physical objects in the physical world through the substantially transparent display, while also viewing and interacting with the virtual objects that are displayed on the substantially transparent display. Further, the user of such a substantially transparent display may perceive the virtual objects as "floating" in space, rather than simply appearing on the surface of the display. Accordingly, virtual objects may be intelligently displayed so as to augment the user's perception of the physical world.

In some cases, however, a virtual object may be displayed such that it appears to be co-located with a physical object. This may be undesirable, as it may lessen the verisimilitude of the virtual object for the user. In particular, when a virtual object and a physical object are co-located, the virtual object and the physical object may appear to co-exist in way that is not physically possible, and therefore lessen the user's perception that the virtual objects are part of the physical world.

To help avoid apparent co-location of virtual and physical objects, the wearable computing device may be configured to determine a focal length at which the virtual object is being displayed, as well as a first line of sight along which a user of the wearable computing device may see the virtual object. Additionally, the wearable computing device may be configured to detect a distance to the physical object, as well as a second line of sight along which the user of the wearable computing device may see the physical object. In some cases, the first line of sight may be substantially the same as the second line of sight. In any case, when the focal length to the virtual object and the distance to the physical object are substantially equal, and the first line of sight is substantially aligned with the second line of sight, the virtual object may appear to the user to be co-located with the physical object.

To avoid apparent co-location of the virtual object and the physical object, the wearable computing device may initiate a collision action. The collision action may involve the virtual object moving away from the physical object, as if the virtual object collided with the physical object. Alternately or additionally, the virtual object may change shape, as if the virtual object collided with the physical object. The collision action may take other forms as well.

2. Example User-Interface

FIG. 1A shows aspects of an example user-interface 100, in accordance with an embodiment. The user-interface 100 may be displayed by, for example, a wearable computing device, such as the wearable computing devices described below in connection with FIGS. 4A-7. In particular, the user-interface 100 may be displayed on a substantially transparent display of the wearable computing device.

An example state of the user-interface 100 is shown in FIG. 1A. The example state shown in FIG. 1A may correspond to a first position of the wearable computing device. That is, the user-interface 100 may be displayed as shown in FIG. 1A when the wearable computing device is in the first position. In some embodiments, the first position of the wearable computing device may correspond to a position of the wearable computing device when a user of the wearable computing device is looking in a direction that is generally parallel to the ground (e.g., a position that does not correspond to the user looking up or looking down). Other examples are possible as well.

As shown, the user-interface 100 includes a view region 102. An example boundary of the view region 102 is shown by a dotted frame. While the view region 102 is shown to have a landscape shape (in which the view region 102 is wider than it is tall), in other embodiments the view region 102 may have a portrait or square shape, or may have a non-rectangular shape, such as a circular or elliptical shape. The view region 102 may have other shapes as well.

The view region 102 may be, for example, the viewable area between (or encompassing) the upper, lower, left, and right boundaries of the substantially transparent display on the wearable computing device. As shown, when the wearable computing device is in the first position, the view region 102 is substantially empty (e.g., completely empty), such that the user's view of the physical world is generally uncluttered, and physical objects in the user's environment are not obscured.

In some embodiments, the view region 102 may correspond to a field of view of a user of the wearable computing device, and an area outside the view region 102 may correspond to an area outside the field of view of the user. In other embodiments, the view region 102 may correspond to a non-peripheral portion of a field of view of the user of the wearable computing device, and an area outside the view region 102 may correspond to a peripheral portion of the field of view of the user. In still other embodiments, the user-interface 100 may be larger than or substantially the same size as a field of view of the user of the wearable computing device, and the field of view of the user may be larger than or substantially the same size as the view region 102. The view region 102 may take other forms as well.

Accordingly, the portions of the user-interface 100 outside of the view region 102 may be outside of or in a peripheral portion of a field of view of the user of the wearable computing device. For example, as shown, a content region 104 may be outside of or in a peripheral portion of the field of view of the user in the user-interface 100. While the content region 104 is shown to be not visible in the view region 102, in some embodiments the content region 104 may be partially visible in the view region 102.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the view region 102 and the content region 104 to move such that the content region 104 becomes more visible in the view region 102. For example, the wearable computing device may cause the view region 102 to move upward and/or may cause the content region 104 to move downward. The view region 102 and the content region 104 may move the same amount, or may move different amounts. In one embodiment, the content region 104 may move further than the view region 102. As another example, the wearable computing device may cause only the content region 104 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of the user of the wearable computing device. Other reference frames are possible as well. In embodiments where the wearable computing device is a head-mounted device, the upward movement of the wearable computing device may also be an upward movement of the user's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement. In some embodiments, the movement data may be a binary indication corresponding to the upward movement. In other embodiments, the movement data may be an indication corresponding to the upward movement as well as an extent of the upward movement. The movement data may take other forms as well.

Thus, the view region 102 may be moved in response to receiving data corresponding to an upward movement. In some embodiments, the view region 102 may be moved in an upward scrolling or panning motion. For instance, the view region 102 may appear to the user of the wearable computing device as if mapped onto the inside of a static sphere centered at the wearable computing device, and movement of the view region 102 may map onto movement of the real-world environment relative to the wearable computing device. A speed, acceleration, and/or magnitude of the upward scrolling may be based at least in part on a speed, acceleration, and/or magnitude of the upward movement. In other embodiments, the view region 102 may be moved by, for example, jumping between fields of view. In still other embodiments, the view region 102 may be moved only when the upward movement exceeds a threshold speed, acceleration, and/or magnitude. In response to receiving data corresponding to an upward movement that exceeds such a threshold or thresholds, the view region 102 may pan, scroll, slide, or jump to a new field of view. The view region 102 may be moved in other manners as well.

In some embodiments, the content region 104 may be arranged in a ring (or partial ring) around and above the head of the user of the wearable computing device. A ring or partial ring in this sense should not be considered necessarily circular, but rather may be represented by any type of arc, ellipse, or piece-wise combination of arcs. In other embodiments, the content region 104 may be arranged in a dome-shape above the user's head. The ring or dome may be centered above the wearable computing device and/or the user's head. In other embodiments, the content region 104 may be arranged in other ways as well.

As shown, the content region 104 includes a number of content objects. The number, arrangement, and form of the content objects may vary. In embodiments where the content region 104 extends circularly around the user's head, like a ring (or partial ring), only some of the content objects may be visible at a particular moment. In order to view other content objects, the user of the wearable computing device may interact with the wearable computing device to, for example, rotate the content region 104 along a path (e.g., clockwise or counterclockwise) around the user's head. To this end, the wearable computing device may be configured to receive data indicating such an interaction through, for example, a touch pad, such as finger-operable touch pad 124. Alternatively or additionally, the wearable computing device may be configured to receive such data through other input devices as well.

While the foregoing description focused on upward movement, it is to be understood that the wearable computing device could be configured to receive data corresponding to other directional movement (e.g., downward, leftward, rightward, etc.) as well, and that the view region 102 may be moved in response to receiving such data in a manner similar to that described above in connection with upward movement. Further, while the content region 104 is shown to be positioned above the view region, it is to be understood that the content region 104 may be otherwise positioned relative to the view region (e.g., below, to the left of, to the right of, etc.). In some embodiments, the direction movement may correspond to the position of the content region 104. For example, the content region 104 may be position to the left of the view region 102, and the wearable device may be configured to receive data corresponding to leftward movement. In response to receiving the data corresponding to leftward movement, the view region 102 may be moved leftward, such that the content region 104 becomes more visible in the view region 102. Other examples are possible as well.

As shown, the user-interface 100 further includes a virtual object 106. The virtual object 106 may be any graphical media content, such as text, images, application windows, or video. For example, the virtual object 106 may be a message from a friend (as shown). As another example, the virtual object 106 may be a calendar reminder from a calendar of the user of the wearable computing device. As yet another example, the virtual object 106 may be a status update from a social networking site of the user of the wearable computing device. As still another example, the virtual object 106 may be the title and artist of a song playing on the wearable computing device or another device coupled to the wearable computing device. As still another example, the virtual object may be information corresponding to a physical object in the physical world surrounding the user of the wearable computing device. Other examples are possible as well. While only one virtual object 106 is shown, in some embodiments more virtual objects may be displayed on the user-interface 100.

Further, as shown, a physical object 108 is visible through the view region 102 of the user-interface 100. The physical object may be any object in the physical world surrounding the user. For example, the physical object may be a dog (as shown). Other examples are possible as well. In embodiments where the display of the wearable computing device on which the user-interface is displayed is substantially transparent, the user may view the physical object through the display, and thus the user-interface 100. While only one physical object 108 is shown, in some embodiments more physical objects may be visible through the user-interface 100.

In some embodiments, the user-interface 100 may include a cursor 110, shown in FIG. 1A as a reticle, which may be used to navigate and make selections within the user-interface 100. In some embodiments, the cursor 110 may be controlled by a user of the wearable computing device through one or more predetermined movements of the user and/or the wearable computing device. Accordingly, the wearable computing device may be further configured to receive data corresponding to the one or more predetermined movements.

Thus, the user-interface 100 may include one or more virtual objects 106. Further, one or more physical objects 108 may be visible through the user-interface 100. The manner in which a user of the wearable computing device may view each of the virtual object 106 and the physical object 108 is illustrated in FIGS. 1B-1D.

Figure 1B:
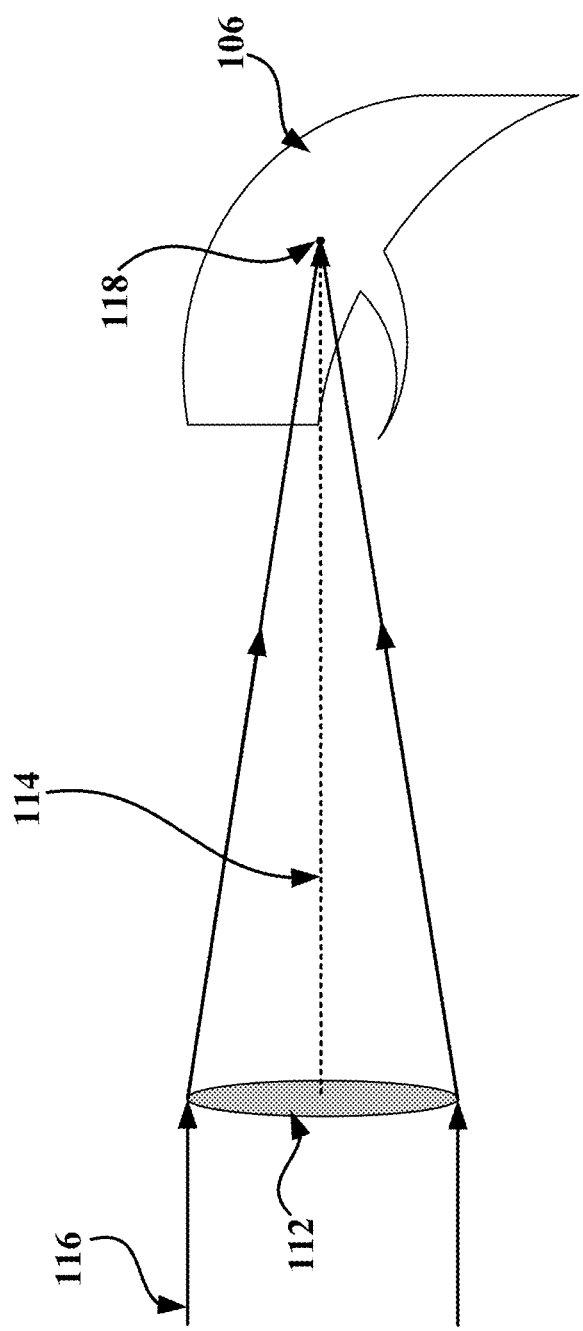
FIG. 1B illustrates displaying a virtual object at a focal length, in accordance with an embodiment.
Figure 1C:
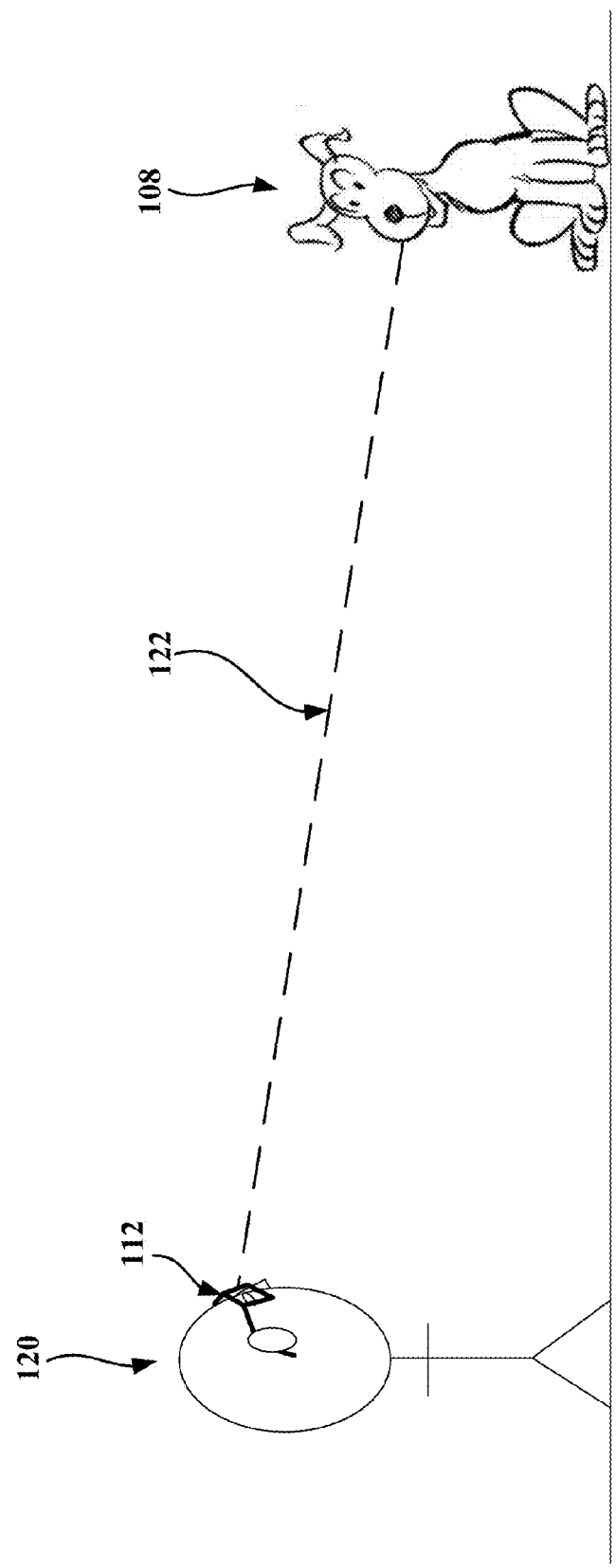
FIG. 1C illustrates viewing a physical object at a distance, in accordance with an embodiment.
Figure 1D:
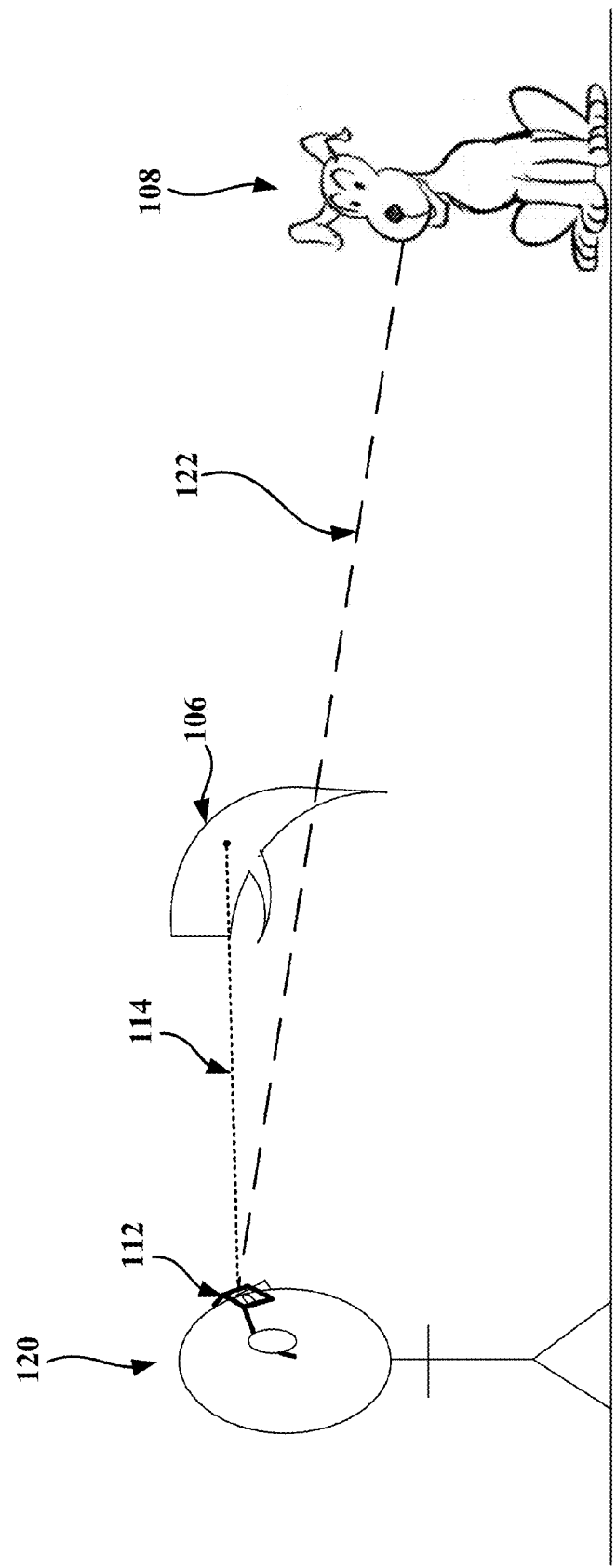
FIG. 1D illustrates viewing a virtual object displayed at a focal length and a physical object at a distance, in accordance with an embodiment.

FIG. 1B illustrates displaying the virtual object 106 at a focal length 114, in accordance with an embodiment. As shown, a lens 112 receives light 116. The lens 112 may be, for example, a lens in the substantially transparent display of a wearable computing device. The light 116 corresponds to the virtual object 106. Accordingly, the light 116 may be controlled by the wearable computing device.

As a result of passing through the lens 112, the light 116 converges at a point 118, where the virtual object 106 is displayed. The distance from the lens 112 to the point 116 is the focal length 114. Thus, the virtual object 106 may be said to be displayed at the focal length 114.

While the virtual object 106 is shown to be displayed directly in front of the lens 112, in some embodiments the virtual object 106 may be displayed to the left or right of the lens and/or above or below the lens. A line of sight along which a user of the wearable computing device views the virtual object 106 depends on where the virtual object 106 is displayed with respect to the wearable computing device (e.g., to the left and above, or straight ahead and below, etc.). The line of sight may be described in terms of vectors and/or angles, or in other manners.

Both the focal length 114 at which the virtual object 106 is displayed and a line of sight along which the virtual object 106 is displayed may be controllable by the wearable computing device. Accordingly, the wearable computing device comprising the lens 112 may determine the focal length 114 and the line of sight for the virtual object 106.

FIG. 1C illustrates viewing a physical object 108 at a distance 122, in accordance with an embodiment. As shown, a user 120 wears a wearable computing device including a lens 112. The lens 112 may be substantially transparent, such that the user 120 may see the physical object 108 through the lens 112. The distance 122 may be a physical distance between the wearable computing device and the physical object 108.

The physical object 108 is shown to be displayed in front of and below the lens 112. A line of sight from along which the physical object 108 may be viewed may thus be said to be straight ahead and below. Other lines of sight are possible as well. In general, the line of sight depends on where the physical object 108 is located with respect to the wearable computing device (e.g., to the right and above, or to the left and below, etc.). The line of sight may be described in terms of vectors and/or angles, or in other manners.

Both the distance 122 to the physical object 108 and the line of sight along which the physical object 108 is viewed may be detectable by the wearable computing device. The wearable computing device comprising the lens 112 may detect the distance 122 and the line of sight for the physical object 108 in several manners, as described below in connection with FIG. 2.

As the lens 112 may be substantially transparent, a user 120 of the wearable computing device may view the virtual object 106 and the physical object 108 simultaneously. In particular, the user 120 may view the virtual object 106 on the lens 112, and may view the physical object 108 through the lens 112.

FIG. 1D illustrates viewing a virtual object 106 displayed at a focal length 114 and a physical object 108 at a distance 122, in accordance with an embodiment. As shown, the user 120 views the virtual object 106 at the focal length 114 along a first line of sight. Further, the user 120 views the physical object 108 at the distance 122 along a second line of sight. The user 120 thus views the virtual object 106 and the physical object 108 simultaneously.

For various reasons, one or more of the focal length 114, the first line of sight, the distance 122, and the second line of sight may vary. For example, the wearable computing device may cause the virtual object 106 to move closer to the user 120 (e.g., in response to selection of the virtual object 106 by the user 120, etc.), thereby shortening the focal length. As another example, the user 120 may move in the physical world, thereby changing one or both of the distance 122 and the second line of sight. The focal length 114, the first line of sight, the distance 122, and/or the second line of sight may vary in other ways as well.

In some cases, as a result of the variation, the focal length 114 and the distance 122 may be substantially equal, and the first line of sight may be substantially aligned with the second line of sight. In these cases, the virtual object 106 and the physical object 108 may appear to be co-located. As noted above, such co-location of the virtual object 106 and the physical object 108 may be undesirable, as it may lessen the verisimilitude of the virtual object 106 for the user 120. Accordingly, in these cases it may be desirable to render an interaction between the virtual object 106 and the physical object 108.

3. Example Method for Rendering an Interaction Between a Virtual Object and a Physical Object FIG. 2 is a simplified flow chart illustrating a method 200 for rendering an interaction between a virtual object and a physical object on a substantially transparent display, in accordance with an embodiment.

Figure 2:
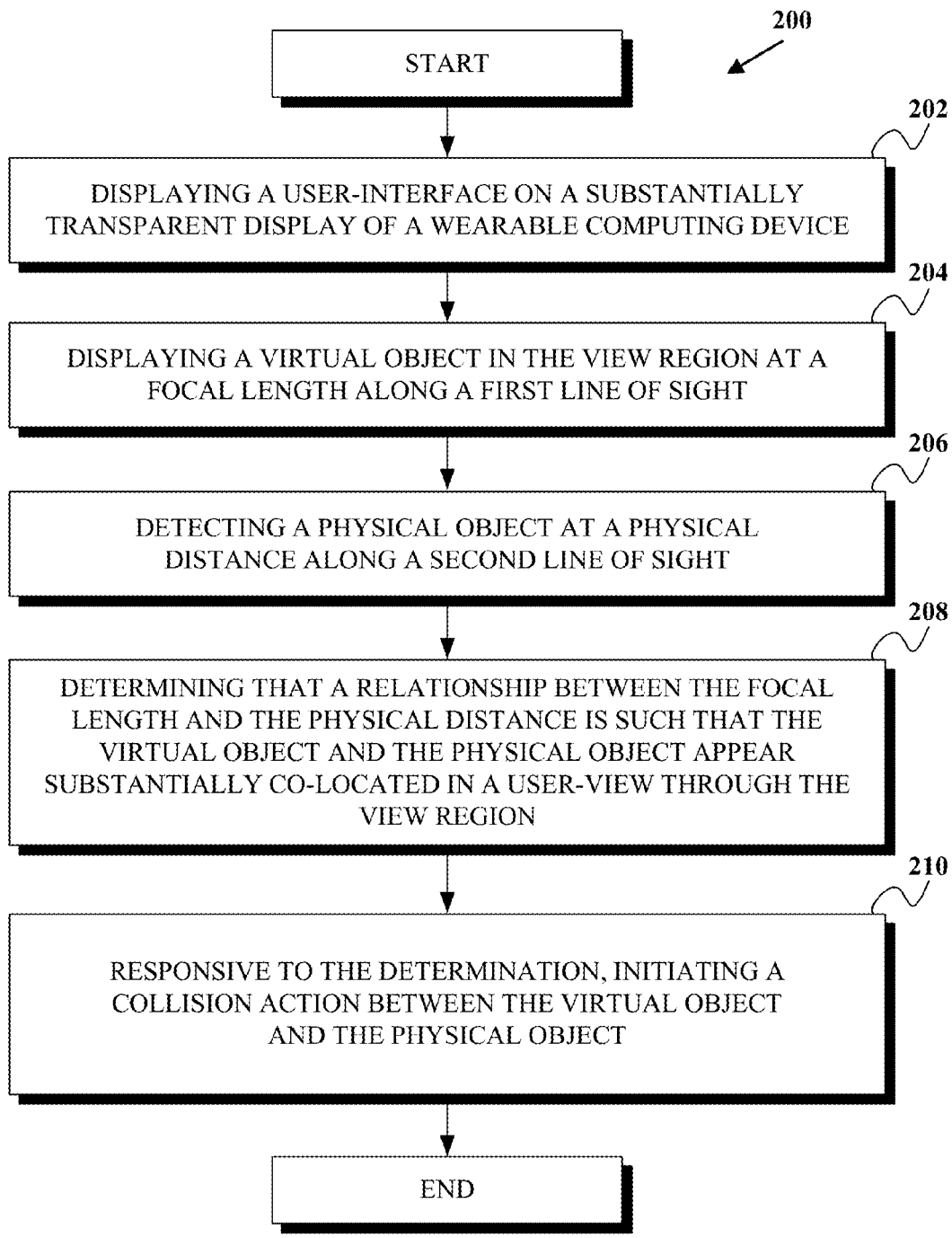
FIG. 2 is a simplified flow chart illustrating a method for rendering an interaction between a virtual object and a physical object, in accordance with an embodiment.

Method 200 shown in FIG. 2 presents an embodiment of a method that, for example, could be used with the systems and devices described herein. Method 200 may include one or more operations, functions, or actions as illustrated by one or more of blocks 202-212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 200, each block may represent circuitry that is wired to perform the specific logical functions in the process.

As shown, the method 200 begins at block 202 where a wearable computing device displays a user-interface on a substantially transparent display of the wearable computing device. The wearable computing device may, for example, be similar to the wearable computing device 700 described below in connection with FIG. 7. Further, the user-interface may be, for example, similar to the user-interface 100 described above in connection with FIGS. 1A-D. In particular, the user-interface may include a view region and at least one content region that is located outside of the view region. The view region may substantially fill a field of view of the display. Further, the at least one content region may not be fully visible in the field of view. In some embodiments, the user-interface may be configured such that the at least one content region is substantially arranged along an at least partial ring above the view region. The at least partial ring may be substantially centered over the wearable computing device. The user-interface may take other forms as well.

The method 200 continues at block 204 where the wearable computing device displays a virtual object in the view region at a focal length along a first line of sight. The focal length may be, for example, a focal length from the wearable computing device. Other focal lengths are possible as well. The virtual object may take any of the forms described above.

The method 200 continues at block 206 where the wearable computing device detects a physical object at a physical distance from the wearable computing device along a second line of sight. The wearable computing device may detect the physical object in several ways.

In some embodiments, the wearable computing device may detect the physical object by emitting a series of pulsed signals and detecting reflections of at least some of the pulsed signals. The pulsed signals may be, for example, acoustic signals, as used in sonar, or may be electromagnetic signals, as used in radar. Other types of pulsed signals are possible as well.

Then, based on the reflections, the wearable computing device may detect the physical object. For example, for a given reflection, the wearable computing device may detect a time delay between the reflection and a pulsed signal corresponding to the reflection, as well as a phase shift of the reflection as compared to the pulsed signal corresponding to the reflection. Then, the wearable computing device may use the time delay and the phase shift to determine that the physical object is located at the physical distance away from the wearable computing device along the second line of sight. Further, for the given reflection, the wearable computing device may detect a direction from which the given reflection was received and/or a direction in which the pulsed signal corresponding to the reflection was emitted. Then, the wearable computing device may use the direction(s) to determine the line of sight along which the user views the physical object.

In some embodiments, in addition to detecting the physical object, the wearable computing device may determine, based on the reflections, a velocity of the physical object relative to the wearable computing device. For example, for a given reflection, in addition to detecting the time delay and the phase shift of the reflection, the wearable computing device may detect a frequency of the reflection. The frequency and phase shift may be used to determine the velocity of the object.

In other embodiments, the wearable computing device may detect the physical object by using an emitter to emitting optical beams to project a two-dimensional structured-light pattern onto the physical object. The structured-light pattern may be, for example, a binary pattern (e.g., black and white stripes), a gray-level pattern (e.g., black, white, and varying shades of gray stripes), a phase-shift pattern (e.g., a fringe pattern formed from sinusoids), or a spatially-varying wavelength pattern (e.g., a rainbow or other color-varying pattern). Alternately or additionally, the structured-light pattern may be a two-dimensional grid pattern (e.g., a pseudo-random binary array, a color-coded grid, or a two-dimensional array of color-coded dots).

When the structured-light pattern is projected onto the physical object, a number of distortions may occur in the structured-light pattern as a result of variations in the surface of the physical objection.

The wearable computing device may use a detector to image the physical object and the projected structured-light pattern including the distortions. Based on the distortions in the structured-light pattern, the wearable computing device may extract a three-dimensional surface map of the physical object through, for example, triangulation between the emitter, the detector, and the physical object. From the three-dimensional surface map of the physical object, the wearable computing device may detect that the physical object is located at the physical distance away from the wearable computing device along the second line of sight.

The optical beams may be, for example, laser beams and/or infrared beams. Other types of optical beams are possible as well. In some embodiments, in addition to detecting the physical object, the wearable computing device may determine, based on the disturbances, a velocity of the physical object relative to the wearable computing device. To this end, the detector may, after a time period, image the physical object and the structured-light pattern again. If the physical object has moved, new distortions will be present in the structured-light pattern. Based on the new distortions, the wearable computing device may extract a new three-dimensional surface map of the physical object. By comparing the three-dimensional surface map and the new three-dimensional surface map, the wearable computing device may determine a distance and a direction the physical object has moved. Using the distance and the time period (and, in some cases, the direction), the wearable computing device may determine the velocity of the physical object.

In still other embodiments, the wearable computing device may detect the physical object by capturing a first image of the physical object. In particular, the wearable computing device may use the first image to determine a position of the physical object relative to the wearable computing device, or to determine an absolute position of both itself and the physical object.

In order to determine a position of the physical object relative to the wearable computing device, the wearable computing device may need to first determine a scale of the first image. In some embodiments, the scale of the first image may be predetermined. In other embodiments, the wearable computing device may determine the scale of the first image by querying (e.g., with the first image) a remote device coupled to the wearable computing device. The remote device may, for example, be similar to the remote device 604 described below in connection with FIG. 6. The remote device may determine the scale of the first image by, for example, comparing the first image with a database of images having a known scale. Other examples are possible as well.

In response to querying the remote device, the wearable computing device may receive from the remote device the scale of the first image. Alternately, the wearable computing device may receive information from which the scale of the first image may be derived, such as depth information. Once the scale of the first image is determined, the wearable computing device may determine the position of the physical object relative to the wearable computing device, and may use the relative position of the physical object to determine the physical distance to the physical object.

In order to determine the absolute position of both itself and the physical object, the wearable computing device may query (e.g., with the first image) a remote device coupled to the wearable computing device. The remote device may, for example, be similar to the remote device 604 described above in connection with FIG. 6. The remote device may determine the absolute position of the physical object and/or the wearable computing device by, for example, comparing the first image with a database of images having a known absolute position. Further, the remote device may determine the absolute position of the wearable computing device by querying a GPS server. Other examples are possible as well.

In response to querying the remote device, the wearable computing device may receive from the remote device the absolute position of the physical object. In some embodiments, the remote device may additionally receive the absolute position of itself. In other embodiments, the remote device may be configured to determine its own absolute position, such as through a GPS receiver. Once the absolute positions of the physical object and the wearable computing device are determined, the wearable computing device may use the absolute positions to determine the physical distance to the physical object.

The first image may be, for example, a typical image, as from a digital camera, or a lower-resolution image, such as a point-map image, as from a range sensor. Other types of images are possible as well.

In some embodiments, in addition to detecting the physical object, the wearable computing device may determine, based on the first image, a velocity of the physical object relative to the wearable computing device. To this end, the wearable computing device may capture a second image of the physical object. The wearable computing device may determine an absolute or relative position of the physical object in the second image in any of the manners described above in connection with the first image.

The first image may have been captured at a first time, and the second image may have been captured at a second time. Accordingly, the wearable computing device may use the first image, the second image, the first time, and the second time to determine the velocity of the physical object. In particular, the wearable computing device may determine a distance between the position of the physical object in the first image and the position of the physical object in the second image, and may determine a time period from the first time to the second time. Using the distance and the time period, the wearable computing device may determine a velocity of the physical object.

The wearable computing device may detect the physical object in other manners as well. Additionally, the wearable computing device may determine the velocity of the physical object in other manners as well.

The method 200 continues at block 208 where the wearable computing device determines that a relationship between the focal length and the physical distance is such that the virtual object and the physical object appear substantially co-located in a user-view through the view region. In some embodiments, the relationship between the focal length may be substantially equal to the physical distance. For example, the focal length may be exactly equal to the distance, or may be approximately equal to the distance. For example, the focal length may be within a predetermined range of the distance. Other examples are possible as well. Further, in some embodiments, the first line of sight (to the virtual object) may be substantially aligned with the second line of sight (to the physical object). The first line of sight may be exactly aligned with the second line of sight, or may be approximately aligned with the second line of sight. For example, the first line of sight may be within a predetermined range of the second line of sight. Other examples are possible as well.

The method continues at block 210 where, responsive to the first and second determinations, the wearable computing device initiates a collision action between the virtual object and the physical object. The collision action may take several forms.

The collision action may involve the virtual object moving away from the physical object. For example, in embodiments where the virtual object is moving with a velocity prior to the collision action, the collision action may involve determining a first direction of the velocity of the virtual object and moving the virtual object in a second direction that differs from the first direction. As another example, moving the virtual object may involve moving the virtual object out of the view region. Other examples are possible as well.

Alternately or additionally, the collision action may involve the virtual object changing shape. For example, the collision action may involve making a "dent" in the side of the virtual object that collided with the physical object. The shape and/or size of the dent may vary depending on the virtual object, the physical object, or other factors.

In some embodiments, the collision action may take into account one or more parameters of the virtual object and/or the physical object. For example, the collision action may take into account a velocity or acceleration (which may be determined from the velocity) of the physical object, as determined by the wearable computing device. As another example, the collision action may take into account a velocity or acceleration of the virtual object, as controlled by the wearable computing device. As yet another example, the collision action may take into account an estimated mass, material composition, coefficient of friction, hardness, and/or plasticity of the physical object. As still another example, in embodiments where the virtual object represents a physical object, the collision action may take into account an estimated mass, material composition, coefficient of friction, hardness, and/or plasticity of the physical object represented by the virtual object.

For instance, the collision action may involve the virtual object moving away from the physical object. Using estimated masses and velocities of the virtual object and the physical object, the wearable computing device may cause the virtual object to move away from the collision action with a velocity governed by, for example, elastic collision principles.

Alternately or additionally, for instance, the collision action may involve the virtual object changing shape. Using an estimated plasticity of the virtual object, an estimated mass of the physical object, a determined velocity of the physical object, and a shape of the physical object, the virtual object may change shape with a deformation governed by, for example, plastic deformation principles.

In general, the collision action may modify the location and/or shape of the virtual object so as to avoid co-location of the physical object and the virtual object.

4. Example Rendered Interactions Between Virtual Objects and Physical Objects

FIG. 3A shows aspects of an example user-interface 300 in which a virtual object 306 and a physical object 308 are co-located, in accordance with an embodiment. As shown, the user-interface 300 includes a view region 302 and a content region 304 located outside the view region 302. In the user-interface 300, a virtual object 306 appears to be co-located with a physical object 308. That is, the virtual object 306 is displayed at a focal length along a first line of sight, and the physical object 308 is visible at a distance along a second line of sight. The focal length is substantially equal to the distance, and the first line of sight is substantially aligned with the second line of sight. As a result, the virtual object 306 appears to be co-located with the physical object 308.

As noted above, such co-location of the virtual object 306 and the physical object 308 may be undesirable, as it may lessen the verisimilitude of the virtual object 306 for a user of the user-interface 300. Accordingly, in these cases it may be desirable to render an interaction between the virtual object 306 and the physical object 308. A number of example interactions are illustrated in FIGS. 3B-D.

Figure 3B:
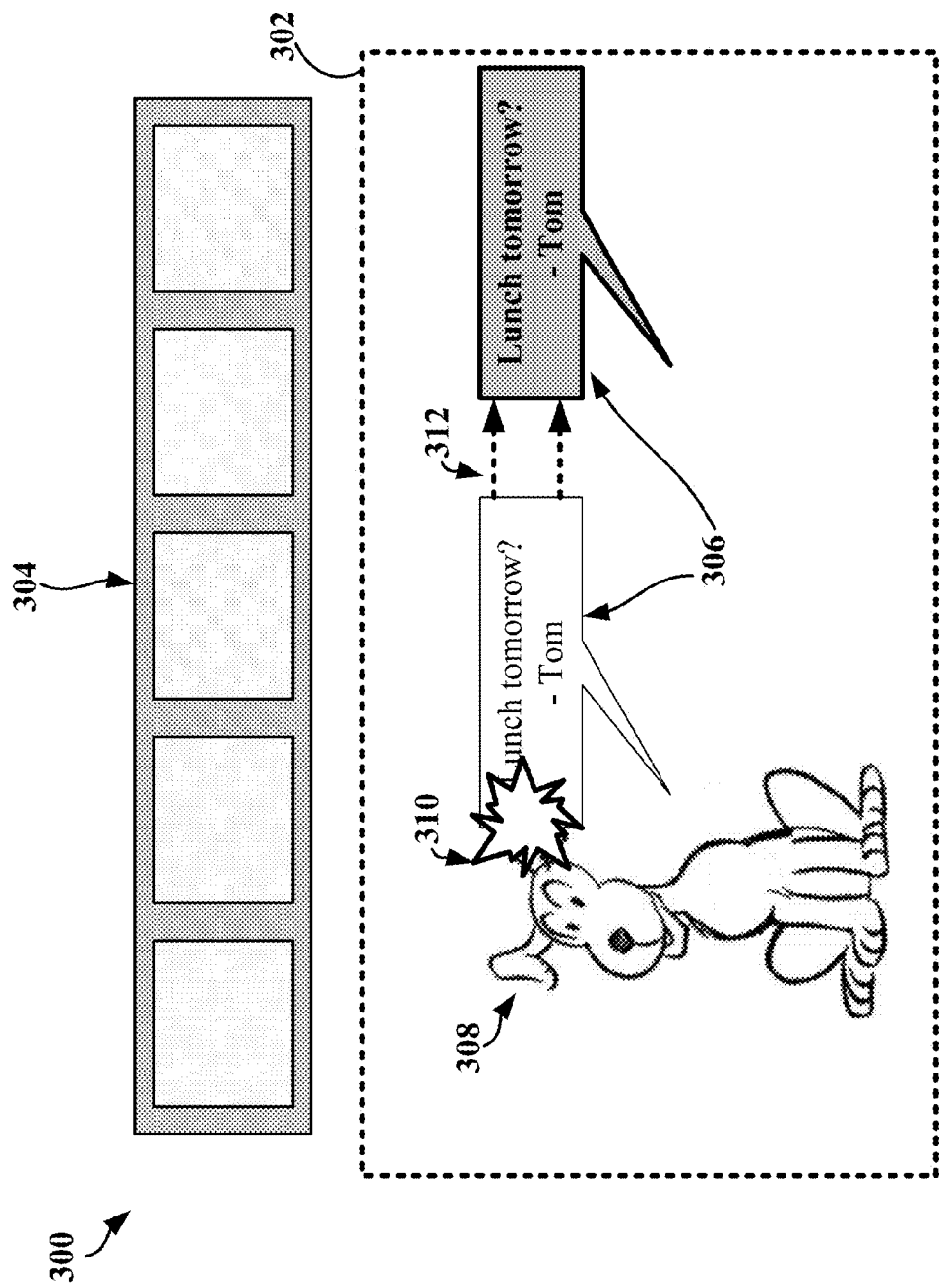
FIG. 3B shows aspects of an example user-interface in which a virtual object moves away from a physical object following collision with the physical object, in accordance with an embodiment.
Figure 3C:
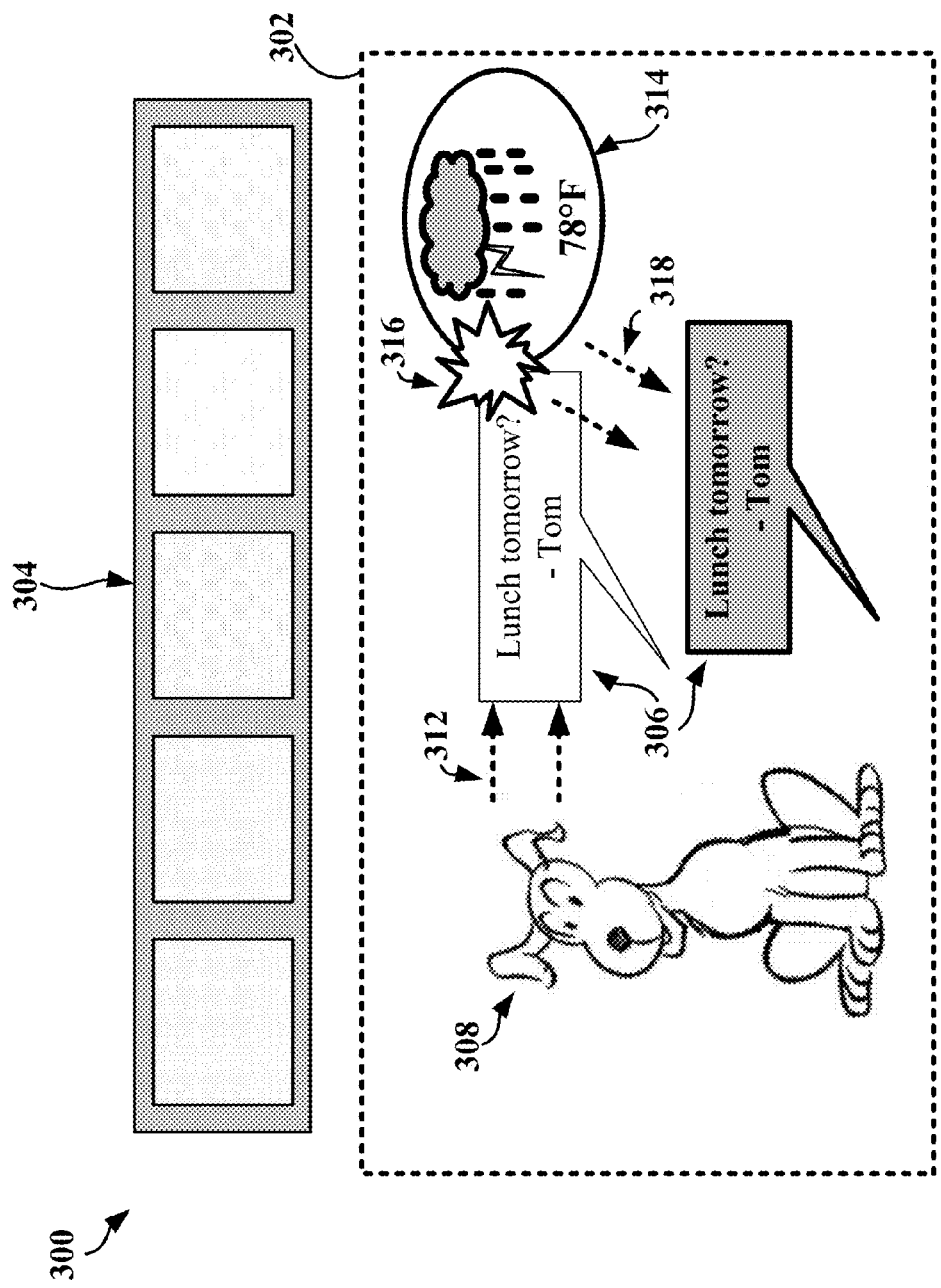
FIG. 3C shows aspects of an example user-interface in which a virtual object moves away from an additional virtual object following collision with the additional virtual object, in accordance with an embodiment.
Figure 3D:
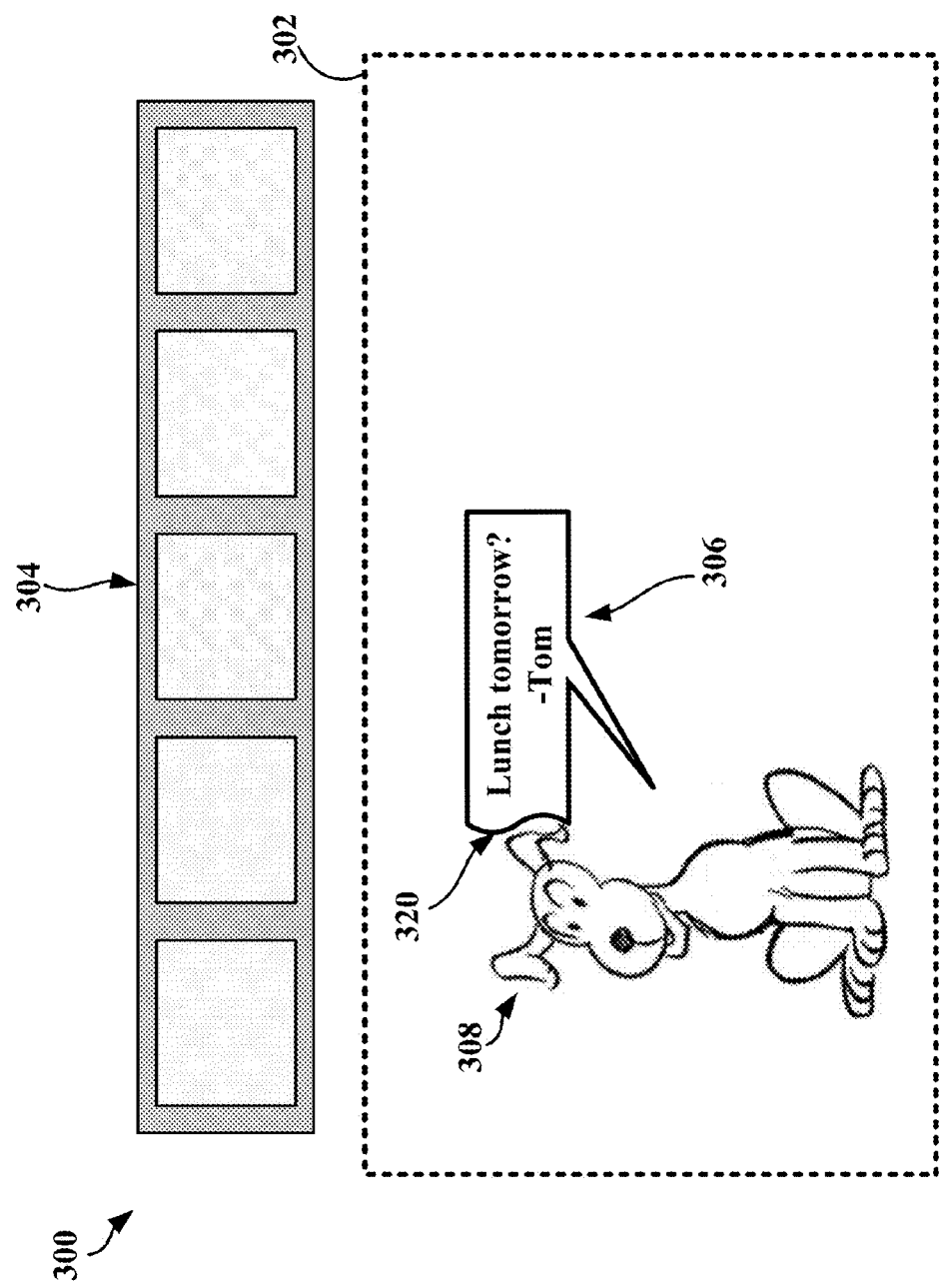
FIG. 3D shows aspects of an example user-interface in which a virtual object changes shape following collision with a physical object, in accordance with an embodiment.

FIG. 3B shows aspects of an example user-interface 300 in which a virtual object 306 moves away from a physical object 308 following collision 310 with the physical object 308, in accordance with an embodiment.

A wearable computing device displaying the user-interface 300 may determine, based on the focal length, the distance, and the first and second lines of sight, that the virtual object 306 is co-located with the physical object 308. In response to detecting that the virtual object 306 is co-located with the physical object 308, the wearable computing device may initiate a collision action. The collision action is indicated by the collision 310.

As shown, following the collision 310, the wearable computing device may cause the virtual object 306 to move away from the physical object 308, as illustrated by the arrows 312. In some embodiments, the direction in which the virtual object 306 moves away and/or the velocity with which the virtual object 306 moves away may be based on one or more parameters of the virtual object 306 and/or the physical object 308, as described above.

In some cases, the user-interface 300 may include one or more additional virtual objects. In these cases, the virtual object 306 may, while moving away from the physical object 308, collide with an additional virtual object. FIG. 3C shows aspects of an example user-interface 300 in which a virtual object 306 moves away from an additional virtual object 314 following collision with the additional virtual object 314, in accordance with an embodiment.

Following collision with the physical object 308, the virtual object 306 may move away from the physical object 306, as illustrated by the arrows 312. While moving away from the physical object 308, the virtual object 306 may move towards the additional virtual object 314. In particular, the virtual object 306 may move to a third focal length from the wearable computing device along a third line of sight. The additional virtual object 314 may be displayed at a fourth focal length from the wearable computing device along a fourth line of sight.

The wearable computing device may determine, based on the third and fourth focal lengths and the third and fourth lines of sight, that the virtual object 306 is co-located with the additional virtual object 314. In response to detecting that the virtual object 306 is co-located with the additional virtual object 314, the wearable computing device may initiate a collision action. The collision action is indicated by the collision 316.

As shown, following the collision 316, the wearable computing device may cause the virtual object 306 to move away from the additional virtual object 314, as illustrated by the arrows 318. In some embodiments, the direction in which the virtual object 306 moves away and/or the velocity with which the virtual object 306 moves away may be based on one or more parameters of the virtual object 306 and/or the additional virtual object 314, as described above.

Instead of or in addition to moving away from the object with which it collided, in some embodiments the collision action may involve the virtual object 306 changing shape. FIG. 3D shows aspects of an example user-interface 300 in which a virtual object 306 changes shape following collision with a physical object 308, in accordance with an embodiment.

The wearable computing device may determine, based on the focal length, the distance, and the first and second lines of sight, that the virtual object 306 is co-located with the physical object 308. In response to detecting that the virtual object 306 is co-located with the physical object 308, the wearable computing device may initiate a collision action. The collision action may involve the virtual object 306 changing shape. As shown, the wearable computing device causes a deformation 320 of the virtual object 306. In some embodiments, the size and/or shape of the deformation 320 may be based on one or more parameters of the virtual object 306 and/or the physical object 708, as described above.

While the deformation 320 is shown to result from a collision between the virtual object 306 and the physical object 308, in some cases a similar deformation or other shape change may result from a collision between the virtual object 306 and an additional virtual object, such as the additional virtual object 314 described above.

In some embodiments, all collision actions may all involve the virtual object moving away from the object (virtual or physical) with which it collided. In other embodiments, all collision actions may involve the virtual object changing shape. In still other embodiments, all collision actions may involve the virtual object both moving away from the object with which it collided and changing shape. In still other embodiments, collision actions between the virtual object and physical objects may involve the virtual object moving away from the physical object with which it collided, while collision actions between the virtual object and other virtual objects may involve the virtual object changing shape, or vice versa. In still other embodiments, a virtual object may undergo a first collision action with a first object (virtual or physical) and a second collision with a second object (virtual or physical). The first collision action may involve the virtual object moving away from the object with which it collided, and the second collision action may involve the virtual object changing shape, or vice versa. In still other embodiments, only collision actions between the virtual object and an object (physical or virtual) in which one or both of the objects is moving with a velocity greater than a threshold velocity (or has an estimated mass greater than a threshold mass, etc.) may involve the virtual object moving away from the object with which it collided, while other collision actions may involve the virtual object changing shape, or vice versa. The collision actions may take other forms as well.

5. Example System and Device Architecture

Figure 4A:
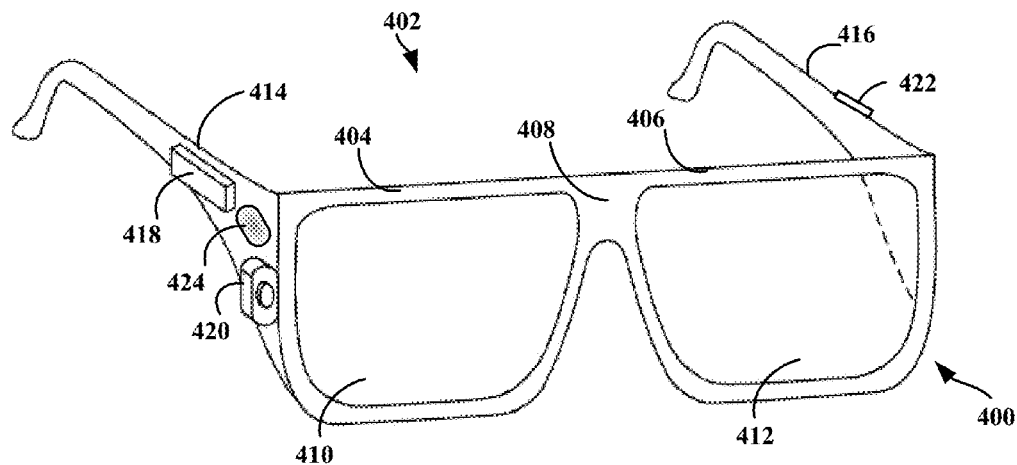
FIG. 4A illustrates an example head-mounted display system, in accordance with an embodiment.

FIG. 4A illustrates an example system 400 for receiving, transmitting, and displaying data. The system 400 is shown in the form of a wearable computing device. While FIG. 4A illustrates a head-mounted device 402 as an example of a wearable computing device, other types of wearable computing devices could additionally or alternatively be used. As illustrated in FIG. 4A, the head-mounted device 402 has frame elements including lens-frames 404, 406 and a center frame support 408, lens elements 410, 412, and extending side-arms 414, 416. The center frame support 408 and the extending side-arms 414, 416 are configured to secure the head-mounted device 402 to a user's face via a user's nose and ears, respectively.

Each of the frame elements 404, 406, and 408 and the extending side-arms 414, 416 may be formed of a solid structure of plastic and/or metal, or may be formed of a hollow structure of similar material so as to allow wiring and component interconnects to be internally routed through the head-mounted device 402. Other materials may be possible as well.

One or both of the lens elements 410, 412 may be formed of any material that can suitably display projected images or graphics, which may include any number of virtual objects. Each of the lens elements 410, 412 may also be sufficiently transparent to allow a user to see through the lens element into the physical world, which may include any number of physical objects. Combining these two features of the lens elements may facilitate an augmented reality or heads-up display where the virtual objects of the projected images or graphics are superimposed over the physical objects of the physical world, as perceived by the user through the lens elements 410, 412.

The extending side-arms 414, 416 may each be projections that extend away from the lens-frames 404, 406, respectively, and may be positioned behind a user's ears to secure the head-mounted device 402 to the user. The extending side-arms 414, 416 may further secure the head-mounted device 402 to the user by extending around a rear portion of the user's head. Additionally or alternatively, for example, the system 400 may connect to or be affixed within a head-mounted helmet structure. Other possibilities exist as well.

The system 400 may also include an on-board computing system 418, a video camera 420, a sensor 422, and a finger-operable touch pad 424. The on-board computing system 418 is shown to be positioned on the extending side-arm 414 of the head-mounted device 402; however, the on-board computing system 418 may be provided on other parts of the head-mounted device 402 or may be positioned remote from the head-mounted device 402 (e.g., the on-board computing system 418 could be connected by a wired or wireless connection to the head-mounted device 402). The on-board computing system 418 may include a processor and memory, for example. The on-board computing system 418 may be configured to receive and analyze data from the video camera 420, the sensor 422, and the finger-operable touch pad 424 (and possibly from other sensory devices, user-interfaces, or both) and generate images or graphics for output by the lens elements 410 and 412. The on-board computing system 418 may additionally include a speaker or a microphone for user input (not shown).

The video camera 420 is shown positioned on the extending side-arm 414 of the head-mounted device 402; however, the video camera 420 may be provided on other parts of the head-mounted device 402. The video camera 420 may be configured to capture images at various resolutions or at different frame rates. Video cameras with a small form-factor, such as those used in cell phones or webcams, for example, may be incorporated into an example embodiment of the system 400.

Further, although FIG. 4A illustrates one video camera 420, more or fewer video cameras may be used, and each may be configured to capture the same view, or to capture different views. For example, the video camera 420 may be forward facing to capture at least a portion of the physical world viewed by the user. This forward facing image captured by the video camera 420 may then be used to generate an augmented reality where computer-generated images or graphics, including virtual objects, appear to interact with physical objects in the physical world viewed by the user.

While the sensor 422 is shown on the extending side-arm 416 of the head-mounted device 402, in some embodiments the sensor 422 may be positioned on other parts of the head-mounted device 402. The sensor 422 may include one or more of a gyroscope or an accelerometer, for example. Other sensing devices may be included within, or in addition to, the sensor 422 or other sensing functions may be performed by the sensor 422.

The finger-operable touch pad 424 is shown on the extending side-arm 414 of the head-mounted device 402. However, the finger-operable touch pad 424 may be positioned on other parts of the head-mounted device 402. Also, more than one finger-operable touch pad may be present on the head-mounted device 402. The finger-operable touch pad 424 may be used by a user to input commands. The finger-operable touch pad 424 may sense at least one of a position and a movement of a finger via capacitive sensing, resistance sensing, or a surface acoustic wave process, among other possibilities. The finger-operable touch pad 424 may be capable of sensing finger movement in a direction parallel or planar to the pad surface, in a direction normal to the pad surface, or both, and may also be capable of sensing a level of pressure applied to the pad surface. The finger-operable touch pad 424 may be formed of one or more translucent or transparent insulating layers and one or more translucent or transparent conducting layers. Edges of the finger-operable touch pad 424 may be formed to have a raised, indented, or roughened surface, so as to provide tactile feedback to a user when the user's finger reaches the edge, or other area, of the finger-operable touch pad 424. If more than one finger-operable touch pad is present, each finger-operable touch pad may be operated independently, and may provide a different function.

Figure 4B:
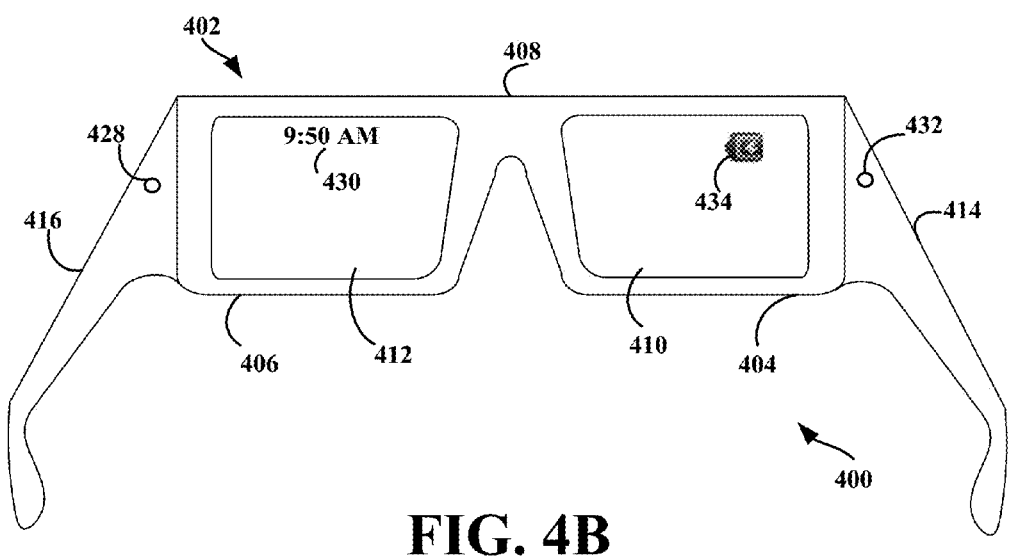
FIG. 4B illustrates an alternate view of the system illustrated in FIG. 4A, in accordance with an embodiment.

FIG. 4B illustrates an alternate view of the system 400 illustrated in FIG. 4A. As shown in FIG. 4B, the lens elements 410, 412 may act as display elements. The head-mounted device 402 may include a first projector 428 coupled to an inside surface of the extending side-arm 416 and configured to project a display 430 onto an inside surface of the lens element 412. Additionally or alternatively, a second projector 432 may be coupled to an inside surface of the extending side-arm 414 and configured to project a display 434 onto an inside surface of the lens element 410. One or both of displays 430 and 434 may include any number of virtual objects.

The lens elements 410, 412 may act as a combiner in a light projection system and may include a coating that reflects the light projected onto them from the projectors 428, 432. In some embodiments, a reflective coating may be omitted (e.g., when the projectors 428, 432 are scanning laser devices).

In alternative embodiments, other types of display elements may also be used. For example, the lens elements 410, 412 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 404, 406 for driving such a matrix display. Alternatively or additionally, a laser or light emitting diode (LED) source and scanning system could be used to draw a raster display directly onto the retina of one or more of the user's eyes. Other possibilities exist as well.

Figure 5A:
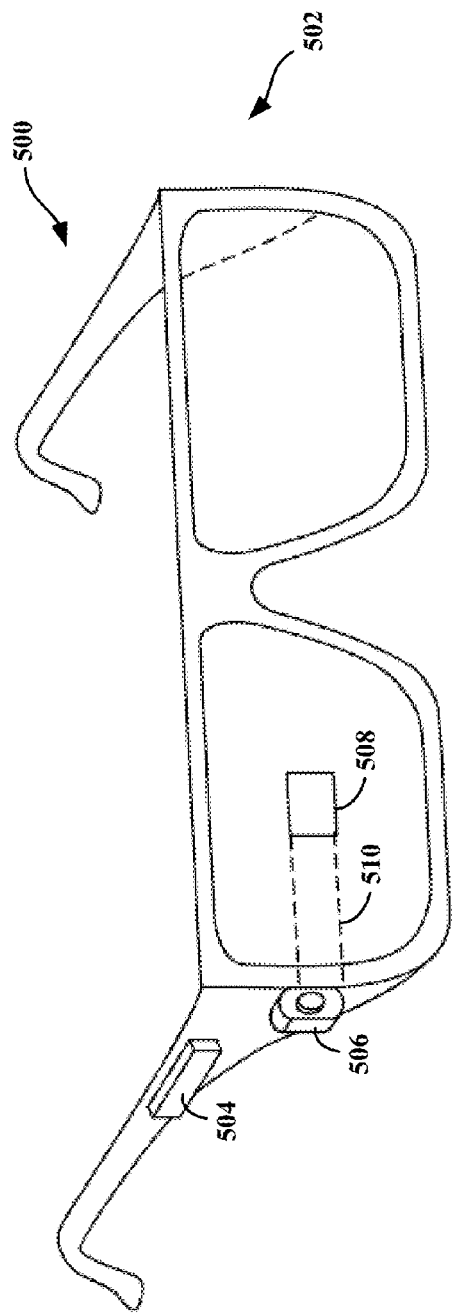
FIG. 5A illustrates an example system for receiving, transmitting, and displaying data, in accordance with an embodiment.

FIG. 5A illustrates an example system 500 for receiving, transmitting, and displaying data. The system 500 is shown in the form of a wearable computing device 502. The wearable computing device 502 may include frame elements and side-arms such as those described with respect to FIGS. 4A and 4B. The wearable computing device 502 may additionally include an on-board computing system 504 and a video camera 506, such as those described with respect to FIGS. 4A and 4B. The video camera 506 is shown mounted on a frame of the wearable computing device 502; however, the video camera 506 may be mounted at other positions as well.

As shown in FIG. 5A, the wearable computing device 502 may include a single display 508 which may be coupled to the device. The display 508 may be formed on one of the lens elements of the wearable computing device 502, such as a lens element described with respect to FIGS. 4A and 4B, and may be configured to overlay virtual objects (e.g., in the form of computer-generated graphics) in the user's view of physical objects in the physical world. The display 508 is shown to be provided in a center of a lens of the wearable computing device 502, however, the display 508 may be provided in other positions. The display 508 is controllable via the computing system 504 that is coupled to the display 508 via an optical waveguide 510.

Figure 5B:
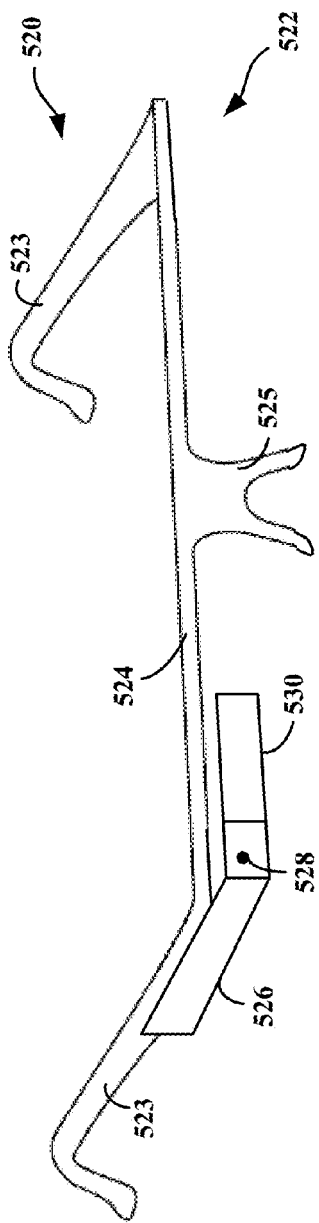
FIG. 5B illustrates an example system for receiving, transmitting, and displaying data, in accordance with an embodiment.

FIG. 5B illustrates an example system 520 for receiving, transmitting, and displaying data. The system 520 is shown in the form of a wearable computing device 522. The wearable computing device 522 may include side-arms 523, a center frame support 524, and a bridge portion with nosepiece 525. In the example shown in FIG. 5B, the center frame support 524 connects the side-arms 523. The wearable computing device 522 does not include lens-frames containing lens elements. The wearable computing device 522 may additionally include an on-board computing system 526 and a video camera 528, such as those described with respect to FIGS. 4A and 4B.

The wearable computing device 522 may include a single lens element 530 that may be coupled to one of the side-arms 523 or the center frame support 524. The lens element 530 may include a display such as the display described with reference to FIGS. 4A and 4B, and may be configured to overlay computer-generated graphics upon the user's view of the physical world. In one example, the single lens element 530 may be coupled to a side of the extending side-arm 523. The single lens element 530 may be positioned in front of or proximate to a user's eye when the wearable computing device 522 is worn by a user. For example, the single lens element 530 may be positioned below the center frame support 524, as shown in FIG. 5B.

Figure 6:
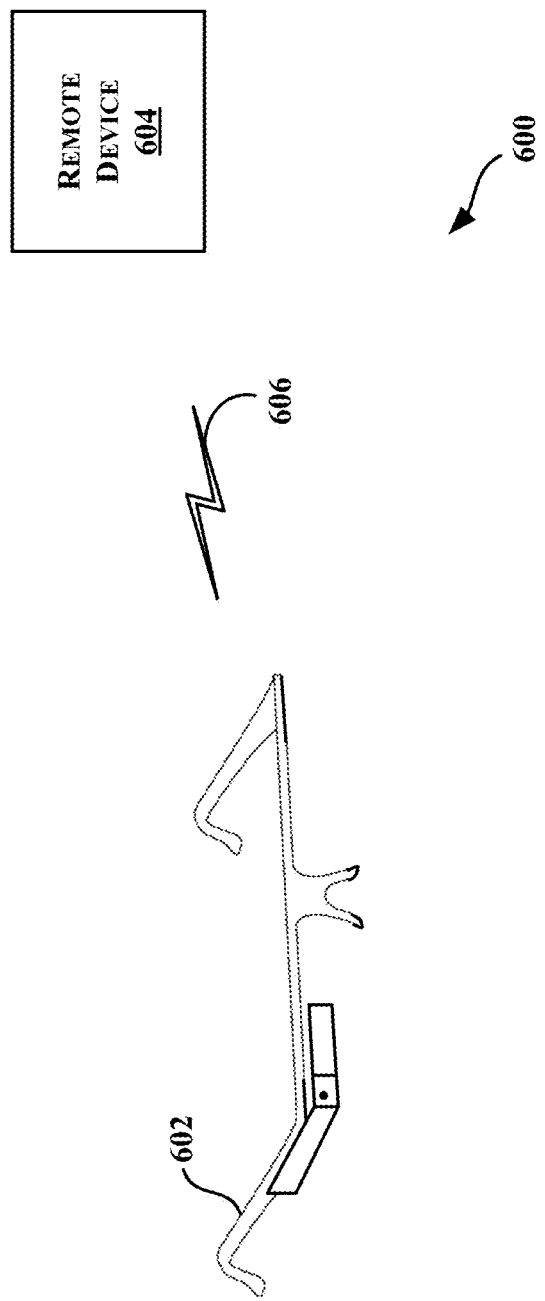
FIG. 6 shows a simplified block diagram of an example computer network infrastructure, in accordance with an embodiment.

FIG. 6 shows a simplified block diagram of an example computer network infrastructure. In system 600, a wearable computing device 602 communicates with a remote device 604 via a communication link 606.

The wearable computing device 602 may be any type of device that can receive data and display information corresponding to or associated with the data. For example, the wearable computing device 602 may be a heads-up display system, such as the head-mounted device 402 described above in connection with FIGS. 4A and 4B, or may be another type of wearable computing device, such as the wearable computing device 502 described above in connection with FIGS. 5A and 5B. The wearable computing device 602 may take other forms as well. An example wearable computing device is further described below in connection with FIG. 7.

The remote device 604 may be any type of computing device or transmitter including a laptop computer, a mobile telephone, or tablet computing device, etc., that is configured to transmit data to the wearable computing device 602. The remote device 604 and the wearable computing device 602 may contain hardware to enable the communication link 606, such as processors, transmitters, receivers, antennas, etc. In some embodiments, the remote device 630 may be accessible via the Internet and may include a computing cluster associated with a particular web service (e.g., social-networking, photo sharing, address book, etc.).

As shown, the communication link 606 may be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In other embodiments, the communication link 606 may be a wired connection. For example, the communication link 606 may be a wired serial bus, such as a universal serial bus or a parallel bus, among other connections. Either of such a wired and/or wireless connection may be a proprietary connection as well.

The example computer network infrastructure 600 may take other forms as well.

Figure 7:
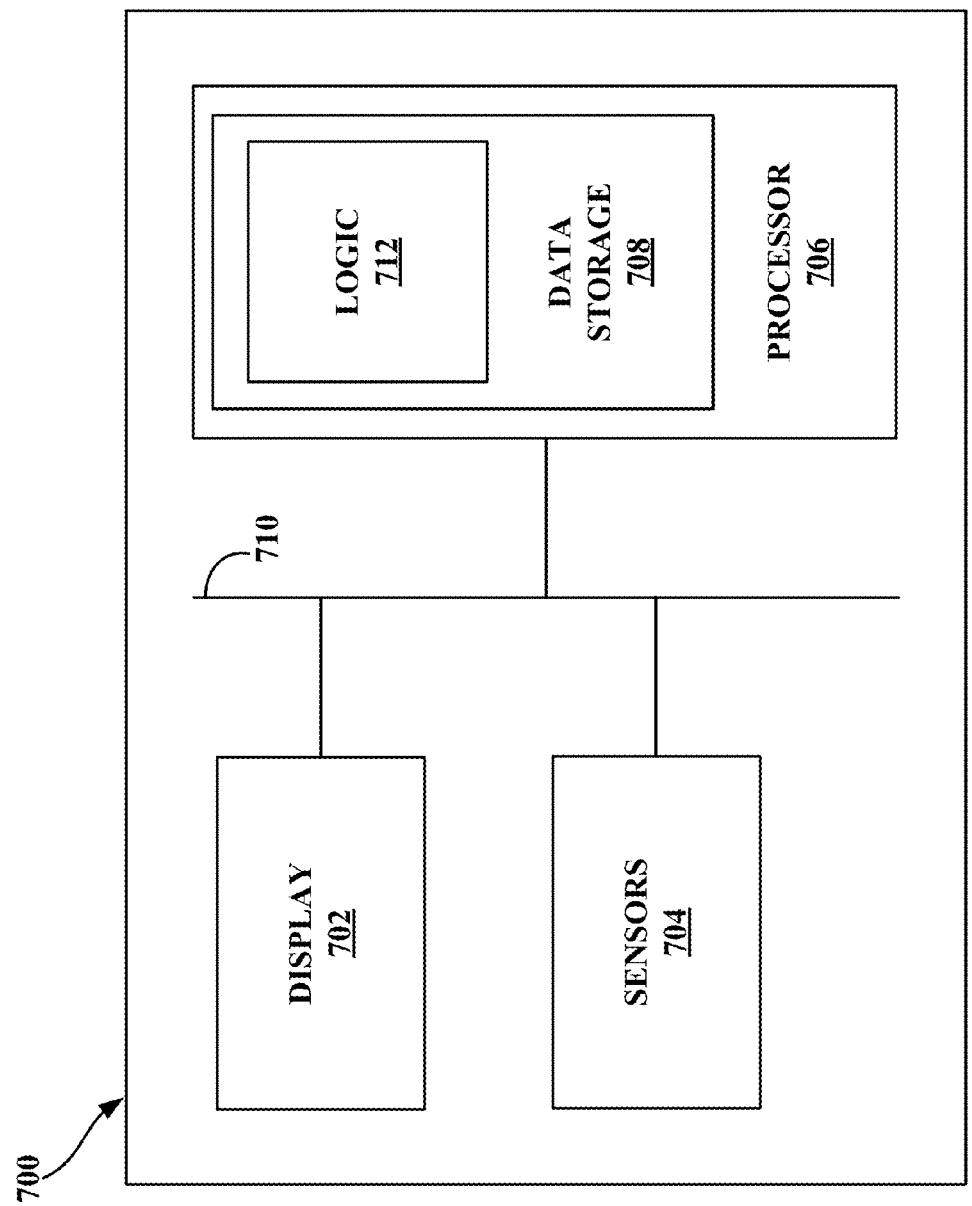
FIG. 7 shows a simplified block diagram depicting example components of an example wearable computing device, in accordance with an embodiment.

FIG. 7 shows a simplified block diagram depicting example components of an example wearable computing device 700, in accordance with an embodiment. As shown, the wearable computing device 700 includes a display 702, sensors 704, a processor 706, and data storage 708, all of which may be communicatively linked together by a system bus, network, and/or other connection mechanism 710.

Display 702 may be, for example, a head-mounted display. The head-mounted display may include various types of displays, such as an optical see-through display, an optical see-around display, or a video see-through display, among others. In some embodiments, the display 702 may be a substantially transparent display, such that a user may perceive the physical world through the display 702.

Sensors 704 may include one or more sensors and/or tracking devices configured to sense one or more types of information. For example, sensors 704 may include an emitter configured to emit a series of pulsed signals, such as acoustic or electromagnetic signals, and detect reflections of at least some of the pulsed signals. As another example, sensors 704 may include at least one laser configured to emit a three-dimensional lattice, as well as at least one detector configured to detect disturbances in the three-dimensional lattice. Other example sensors include movement sensors, video cameras, still cameras, Global Positioning System (GPS) receivers, infrared sensors, optical sensors, biosensors, Radio Frequency identification (RFID) systems, wireless sensors, pressure sensors, temperature sensors, magnetometers, accelerometers, gyroscopes, and/or compasses, among others.

The processor 706 may be one or more general-purpose processors and/or one or more special-purpose processors. To the extent the processor 706 includes more than one processor, such processors could work separately or in combination.

Data storage 708, in turn, may include one or more volatile and/or one or more non-volatile storage components, such as optical, magnetic, and/or organic storage, and data storage 708 may be integrated in whole or in part with the processor 706. For example, the processor 706 and data storage 708 may together be the on-board computing system 418 described above in connection with FIG. 4A. Further, data storage 708 may be one or more removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Data storage 708 may be implemented in any method or technology for storage of information, such as computer readable instructions, data structures, program modules, or other data. For example, data storage 708 may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by the wearable computing device 700.

As shown, data storage 708 includes logic 712. Logic 712 may be executable by the processor 706 to carry out each of the wearable computing device functions described herein. For example, the logic 712 may be executable by the processor 706 to configure data for display on the display 702. The data may include, for example, a user-interface and/or a number of virtual objects. As another example, the logic 712 may be executable by the processor 706 to control and/or communicate with the sensors 704. As still another example, logic 712 may be executable by the processor 706 to carry out the wearable computing device functions described above in connection with FIG. 2.

Although various components of the wearable computing device 700 are shown as distributed components, it should be understood that any of such components may be physically integrated and/or distributed according to the desired configuration of the wearable computing device 700. Additionally, the wearable computing device 700 may include elements instead of or in addition to those shown.

6. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
    displaying a user-interface on a substantially transparent display of a wearable computing device, wherein the user-interface comprises a view region;
    displaying a virtual object in the view region at a focal length along a first of sight;
    determining a physical distance, along the first line of sight, to a physical object;
    determining that the focal length is substantially equal to the physical distance to the physical object, such that the virtual object and the physical object appear substantially co-located, in a user-view through the view region, at the physical distance; and
    responsive to the determination, initiating a collision action between the virtual object and the physical object, wherein the collision action comprises a graphical modification of the virtual object.

2. The method of claim 1, wherein determining the physical distance to the physical object comprises:
    emitting a series of pulsed signals;
    detecting reflections of at least some of the pulsed signals; and
    based on the reflections, detecting the physical object.

3. The method of claim 1, wherein determining the physical distance to the physical object comprises:
    emitting optical beams forming a three-dimensional lattice;
    detecting disturbances in the lattice; and
    based on the disturbances, detecting the physical object.

4. The method of claim 1, wherein determining the physical distance to the physical object comprises:
    capturing a first image of the physical object; and
    based on the first image, determining the physical distance to the physical object.

5. The method of claim 4, further comprising:
    capturing a second image of the physical object, wherein the first image is captured at a first time and the second image is captured at a second time; and
    based on the first image, the second image, the first time, and the second time, determining a velocity of the physical object.

6. The method of claim 1, further comprising:
    using at least one sensor to detect a velocity of the physical object.

7. The method of claim 1, wherein the graphical modification of the virtual object is based on a velocity of the physical object.

8. The method of claim 7, wherein:
    displaying the virtual object comprises displaying the virtual object as moving with a velocity;

wherein the graphical modification of the virtual object is further based on the velocity of the virtual object.

9. The method of claim 1, wherein the graphical modification of the virtual object comprises at least one of the virtual object moving away from the physical object and the virtual object changing shape.

10. The method of claim 1, wherein:
displaying the virtual object comprises displaying the virtual object as moving in a first direction;
wherein the graphical modification of the virtual object comprises moving the virtual object in a second direction that differs from the first direction.

11. The method of claim 1, wherein the graphical modification of the virtual object comprises moving the virtual object out of the view region.

12. The method of claim 1, further comprising:
in response to the virtual object moving away from the physical object, displaying the virtual object at a second focal length from the wearable computing device along a second line of sight;
displaying an additional virtual object at a third focal length from the wearable computing device along a third line of sight;
determining that a relationship between the second focal length and the third focal length is such that the virtual object and the additional virtual object appear substantially co-located in the user-view through the view region; and
responsive to the determination, initiating a collision action between the virtual object and the additional virtual object.

13. The method of claim 1, wherein the user-interface further comprises a content region that is located outside of the view region.

14. The method of claim 13, wherein the user-interface is initially configured such that the at least one content region is substantially arranged along an at least partial ring above the view region and wherein the at least partial ring is substantially centered above the wearable computing device.

15. A wearable computing device comprising:
a substantially transparent display;
at least one processor; and
data storage comprising logic executable by the at least one processor to:
display a user-interface on the substantially transparent display, wherein the user-interface comprises a view region;
determining a physical distance, along the first line of sight, to a physical object;
determine that the focal length is substantially equal to the physical distance to the physical object, such that the virtual object and the physical object appear substantially co-located, in a user-view through the view region, at the physical distance; and
responsive to the determination, initiate a collision action between the virtual object and the physical object, wherein the collision action comprises a graphical modification of the virtual object.

16. The wearable computing device of claim 15, further comprising:
an emitter configured to emit a series of pulsed signals; and
a detector configured to detect reflections of at least some of the pulsed signals, wherein the logic is further executable by the at least one processor to detect the physical object based on the reflections.

17. The wearable computing device of claim 15, further comprising:
at least one laser configured to emit a three-dimensional lattice; and
at least one detector configured to detect disturbances in the lattice, wherein the logic is further executable by the at least one processor to detect the physical object based on the disturbances.

18. The wearable computing device of claim 15, wherein the graphical modification of the virtual object comprises at least one of the virtual object moving away from the physical object and the virtual object changing shape.

19. A non-transitory computer-readable medium having stored therein instructions executable by a computing device to cause the computing device to perform functions comprising:
displaying a user-interface on a substantially transparent display of a wearable computing device, wherein the user-interface comprises a view region;
displaying a virtual object in the view region at a focal length along a first line of sight;
determining a physical distance, along the first line of sight, to a physical object;
determining that the focal length is substantially equal to the physical distance to the physical object, such that the virtual object and the physical object appear substantially co-located, in a user-view through the view region, at the physical distance; and
responsive to the determination, initiating a collision action between the virtual object and the physical object, wherein the collision action comprises a graphical modification of the virtual object.

20. The non-transitory computer-readable medium of claim 19, wherein the user-interface further comprises a content region that is located outside of the view region, and wherein the user-interface is initially configured such that the at least one content region is arranged along an at least partial ring above the view region and wherein the at least partial ring is substantially centered above the wearable computing device.

* * * * *